(12) United States Patent
Foret

(10) Patent No.: US 8,027,382 B2
(45) Date of Patent: Sep. 27, 2011

(54) PULLDOWN CORRECTION FOR PROGRESSIVE DISPLAY OF AUDIOVISUAL RECORDINGS

(75) Inventor: Cecile M. Foret, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 1314 days.

(21) Appl. No.: 11/475,049

(22) Filed: Jun. 27, 2006

(65) Prior Publication Data

US 2007/0296870 A1 Dec. 27, 2007

(51) Int. Cl.
  *H04N 7/12* (2006.01)
  *H04N 11/02* (2006.01)
  *H04N 11/04* (2006.01)
  *H04N 5/765* (2006.01)
(52) U.S. Cl. .................. 375/240.01; 386/232
(58) Field of Classification Search .............. 375/240
  See application file for complete search history.

(56) References Cited

U.S. PATENT DOCUMENTS

| 4,998,167 | A |   | 3/1991 | Jaqua |
| 4,998,287 | A |   | 3/1991 | Katznelson et al. |
| 5,745,645 | A | * | 4/1998 | Nakamura et al. ............ 386/131 |
| 6,041,142 | A | * | 3/2000 | Rao et al. ............ 382/232 |
| 6,157,412 | A |   | 12/2000 | Westerman et al. |
| 2004/0105029 | A1 |   | 6/2004 | Law et al. |

OTHER PUBLICATIONS

Hollywood Quality Video, "Film Cadence & Video/Film Detection", http://www.hqv.com/technology/index1/cadence_detection.cfm, last visited May 26, 2006.
Ramer, Dan; DVDFILE.COM; "What the Heck Is 3:2 Pulldown?"; http://www.dvdfile.com/news/special_report/production_a_z/3_2_pulldown.htm; last visited Mar. 14, 2006.

* cited by examiner

*Primary Examiner* — Christopher S Kelley
*Assistant Examiner* — Hee-Yong Kim
(74) *Attorney, Agent, or Firm* — Kenyon & Kenyon LLP

(57) ABSTRACT

Embodiments of the present invention relate to methods and systems that may detect cadences and duplicate fields in a video sequence, and correct the sequence to retrieve the original progressive content. Methods according to the present invention may compare consecutive fields of the same parity for similarity, and consecutive fields of the opposite parity for field and frame activity. By analyzing patterns in the similarity and activity of the fields, the cadence may be determined. The invention also provides methods that may be used to adjust for changes in the cadence, such as can result from scene changes in the video stream.

30 Claims, 9 Drawing Sheets

FIG. 4
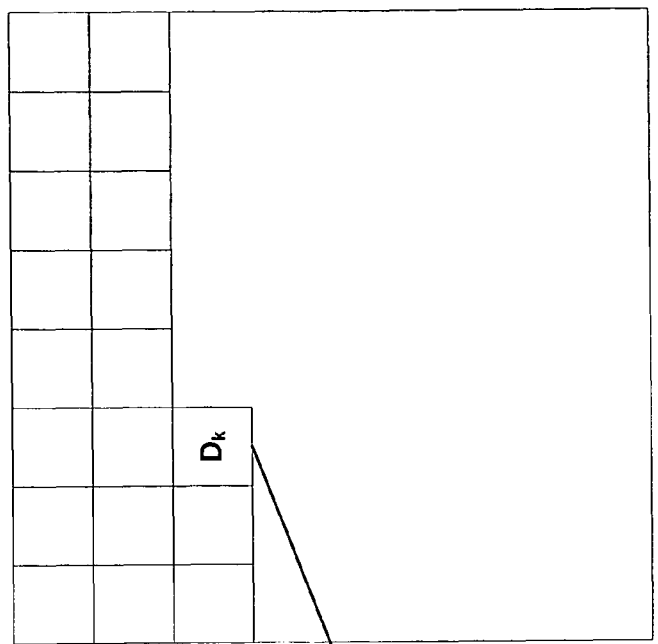
Field 402A
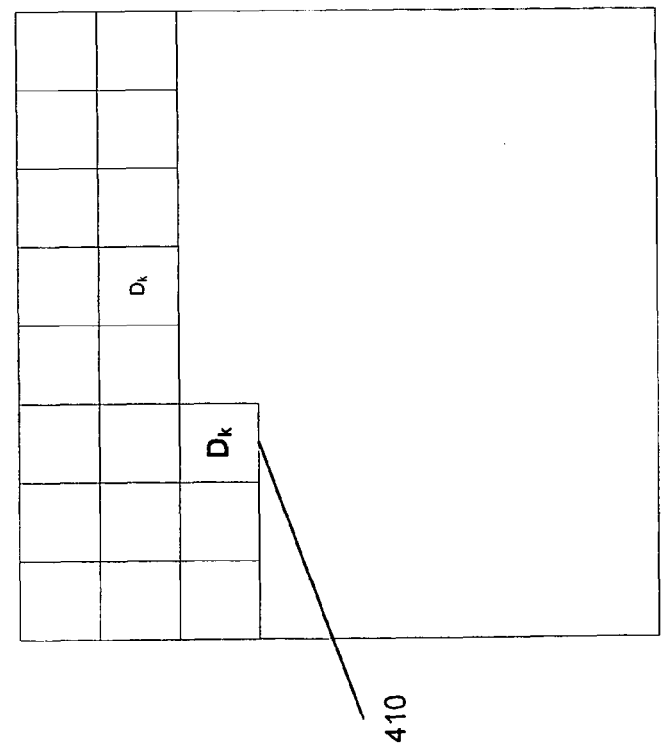
Field 401A

PULLDOWN CORRECTION FOR PROGRESSIVE DISPLAY OF AUDIOVISUAL RECORDINGS

BACKGROUND

When a film or other audiovisual recording is transferred from its original format to a compressed format, it is often converted from one frame rate to another. For example, a motion picture is typically recorded at 24 frames per second (fps) in progressive format, but may be converted to 30 fps for distribution on DVD format or for television broadcast, typically using interlaced displays. An original recording may also be made at other frame rates, such as home video recordings which are typically made at 30 fps in interlaced format. Prior to encoding, an original recording may also be preprocessed, for example to perform noise reduction or frame rate conversion, and edited, for example to insert scene changes.

To compensate for the disparity between the original recording's frame rate and the rate at which it may later be displayed, various techniques of repeating and/or dropping portions of frames are used. The most common technique, used to convert from 24 fps progressive to 30 fps interlaced, is the "3-2 pulldown." Each original progressive frame is first converted to a set of two fields. For every other group of two fields one field is repeated, resulting in a group of three fields followed by a group of two fields, i.e., a 3-2 pattern. The resulting video sequence can then be displayed at 30 fps on an interlaced display device without introducing visual artifacts. Various other conversion techniques may be used.

As a specific example, FIG. 1 shows the standard 3-2 pulldown method as it is used in the art. Although the 3-2 pulldown is shown as an example, embodiments of the present invention also may be used with other conversion methods. In FIG. 1, an original audiovisual recording (100) is made of a series of frames 110, 120, 130, ... 190. To perform a 3-2 pulldown, each frame is first split into a pair of fields (101). For example, frame 110 is split into an even field 110A and an odd field 110B. The fields may be formed, for example, by splitting each frame into many horizontal rows. The even field 110A is then formed of the even-numbered rows; the odd field 110B is similarly formed of only the odd-numbered rows. Each frame is similarly split into a pair of fields: frame 120 is split into 120A and 120B, 130 into 130A and 130B, 140 into 140A and 140B, and so on. Displaying an even "A" field and an odd "B" field in rapid succession or simultaneously causes a complete frame to be displayed. An interlaced display displays the fields in rapid succession; a progressive display displays the fields simultaneously. Each field may be referred to as having an even or odd "parity." Two even fields or two odd fields may be described as having the same parity, while an even field and an odd field may be described as having opposite parity.

To form the video stream using the 3-2 pulldown, the fields are arranged in the order shown at 102. One field from every other frame is repeated, such that the non-repeated field is preceded and followed by a copy of the repeated field. Field 111A is a copy of field 110A; field 131B is a copy of field 130B. In the field order 102 shown in FIG. 1, repeated fields are indicated by bold outlines.

A given conversion technique will result in a "cadence" in the video stream that can be detected during a pre-processing stage prior to encoding, or during a post-processing stage after decoding. When a video stream is encoded it may be desirable for the encoder to identify repeated fields reliably and consistently, to allow the encoder to avoid encoding multiple copies of the same field and accurately identify repeated fields in the encoded stream. Pulldown correction may be done prior to encoding to avoid encoding the repeated fields and optimize processing time and bit rate utilization, resulting in overall higher encoding quality. In such a situation, the repeated fields are marked as such in the compressed stream, instead of being encoded.

However, cadence detection and pulldown correction may be inaccurate due to noise in the original video sequence, which can lead to incorrect processing. In addition, an encoder may be instructed to encode every field, regardless of whether it is a repeated field. In some cases, an encoder may insert flags into the video stream to indicate when a field is repeated, allowing a decoder to avoid decoding the same field twice. Such methods may be error-prone if the encoder incorrectly identifies repeated fields or does not mark fields consistently.

When decoding a stream generated by an encoder that did not perform pulldown correction or performed pulldown correction incorrectly, it may be desirable for a decoder to reliably identify repeated fields regardless of the presence or absence of repeated-field indicators in the stream. A decoder capable of performing pulldown correction may retrieve the original progressive content, thus reducing visual artifacts resulting from improper matching of fields when the video is displayed on a progressive device. By properly identifying and dropping appropriate fields in a video stream, visual artifacts may be reduced.

There are thus several applications where it would be useful to have improved detection of repeated fields and cadences in a video stream.

BRIEF DESCRIPTION OF THE DRAWINGS

FIG. 4 is a block diagram demonstrating a similarity comparison according to an embodiment of the present invention.

DETAILED DESCRIPTION

Embodiments of the present invention relate to methods and systems that may detect cadences and duplicate fields in a video sequence, and correct the sequence to retrieve the original progressive content. At some point in a video distribution system, video processing equipment may process a video sequence for which there is no information to indicate whether the video sequence is represented in interlaced format or progressive format or for which information exists but is coded incorrectly. The present invention provides techniques for a video processing system to identify a cadence from the content of the video sequence itself. Based on the identified cadence, if any, the video processing system may control its own operation, for example, during video coding or video display. In some embodiments, the invention provides techniques to determine the video type, such as progressive or interlaced, of the original video sequence. If the original video sequence is progressive, the original progressive content may be recovered.

Embodiments of the present invention may compare consecutive fields of the same parity to identify repeated fields. A similarity measure may be calculated that provides an indication of how similar two fields of the same parity are. If the similarity measure meets a threshold, one of the fields may be identified as a repeat field. In some embodiments, an adaptive threshold may be used.

Embodiments of the present invention measure activity within display fields and across consecutive display fields to determine whether two consecutive fields can be paired as a progressive frame or not. By making this determination across multiple pairs of fields, a video cadence may be detected. The relation between the field and frame activities may indicate whether two consecutive display fields may be grouped together as a frame.

In some embodiments, the field and frame activity comparison may be correlated with the similarity measure to detect the cadence of a video stream appropriately. The system may further detect interruptions in the video cadence and group fields appropriately in response to scene cuts or other discontinuities in the video sequence.

Figure 2:
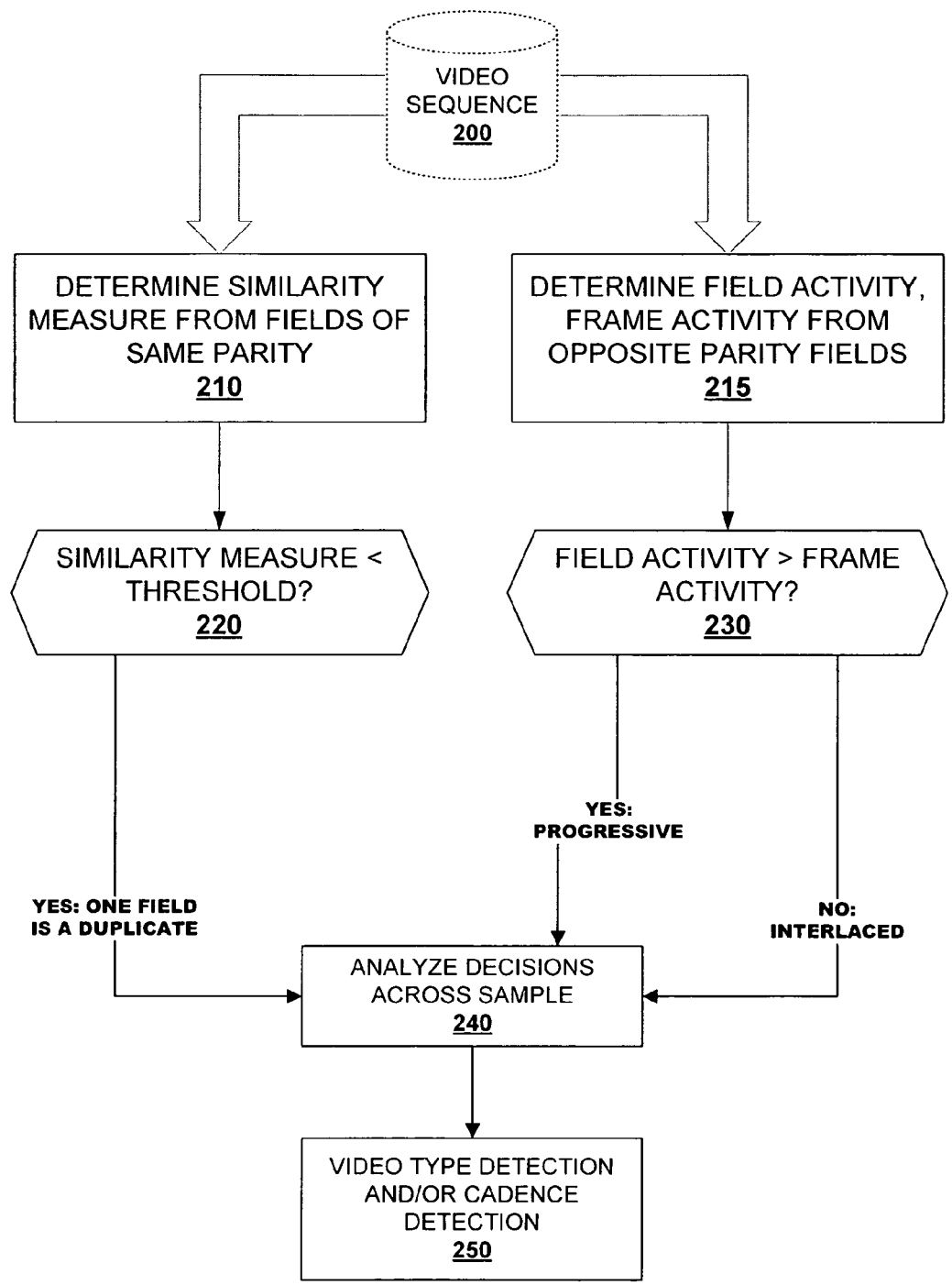
FIG. 2 shows video a method for detecting the cadence and video type of a video sequence according to an embodiment of the invention.

FIG. 2 illustrates a method to detect a cadence of a video sequence according to an embodiment of the present invention. According to the method, fields of a video sequence 200 are considered in the natural display order. A current field may be compared to each of two fields that immediately precede the current field in display order, i.e., a previous field of same parity and a previous field of opposite parity. The method may compare the current field to the previous same parity field to generate a "similarity measure" between them 210, which indicates a degree of correspondence between information content of the two fields. In general, the higher the similarity measure, the less similar the fields are. Ideally, the similarity measure of a field compared to a copy of itself would be 0. In practice, however, the similarity measure between a field and its copy may be non-zero if noise, processing artifacts or other errors were present in the video stream. The similarity measure may therefore be compared to a threshold 220, which may be predetermined or adaptive. If the similarity measure meets the threshold, it may suggest that the method may identify the pair of fields as containing a duplicate field (the current field being a duplicate of the previous field of the same parity). Additionally, if the similarity measure meets the threshold, the current field may be marked as a repeat field.

The current field may also be compared to the previous field of opposite parity 215 to generate a field activity measure and a frame activity measure. The field activity measure may represent activity of information content within the current and opposite parity fields considered singly. The frame activity measure may represents activity of information content with a frame that would be generated from a merger of the current and opposite parity fields. The field activity measure and the frame activity measure may be compared to each other and, based on the comparison, the method may identify the pair of fields as interlaced or progressive 230. If the field activity is greater than the frame activity, the pair of fields may be considered to contain progressive data; otherwise, the pair of fields may be considered to contain interlaced data.

After a statistically significant number of fields have been considered, the method may analyze the progressive/interlaced decisions across a sample of fields 240. Based on the set of decisions, the method may then assign a cadence 250 to the video sequence. The cadence decision may then be used to govern operation of a larger video processing system. For example, if the method was applied in a pre-processing element in a video coding system, the pre-processor may control the encoder to omit coding of repeated frames. Conventional coding standards such as the well known MPEG-2 standard provide coding flags to indicate to a decoder that a repeated field exists. Coded image data is omitted, and the repeated flag is used to indicate the repeated field, in the expectation that the decoder simply will re-use a copy of a previously coded field for display of the repeated field. An encoder under control of a pre-processor according to an embodiment of the invention, may omit all processing that otherwise would be performed on the repeated field.

As applied within a video decoder and display system, the foregoing methods may permit the system to identify a cadence of the video sequence even if the cadence is unspecified in the video sequence or marked incorrectly. A post-processing element may avoid processing fields where a repeated flag is present. However, in some cases the video sequence may have been created by an encoder and/or pre-processor that did not insert repeated field flags, or inserted them incorrectly. A post-processor may use embodiments of the invention to analyze the video sequence and avoid processing repeated fields, even in the absence of the flag. Similarly, the post-processor may control a display unit by indicating the cadence of the video sequence. The post-processor may also retrieve the original progressive content, if any, or further process the interlaced content when no particular cadence is detected.

Figure 3:
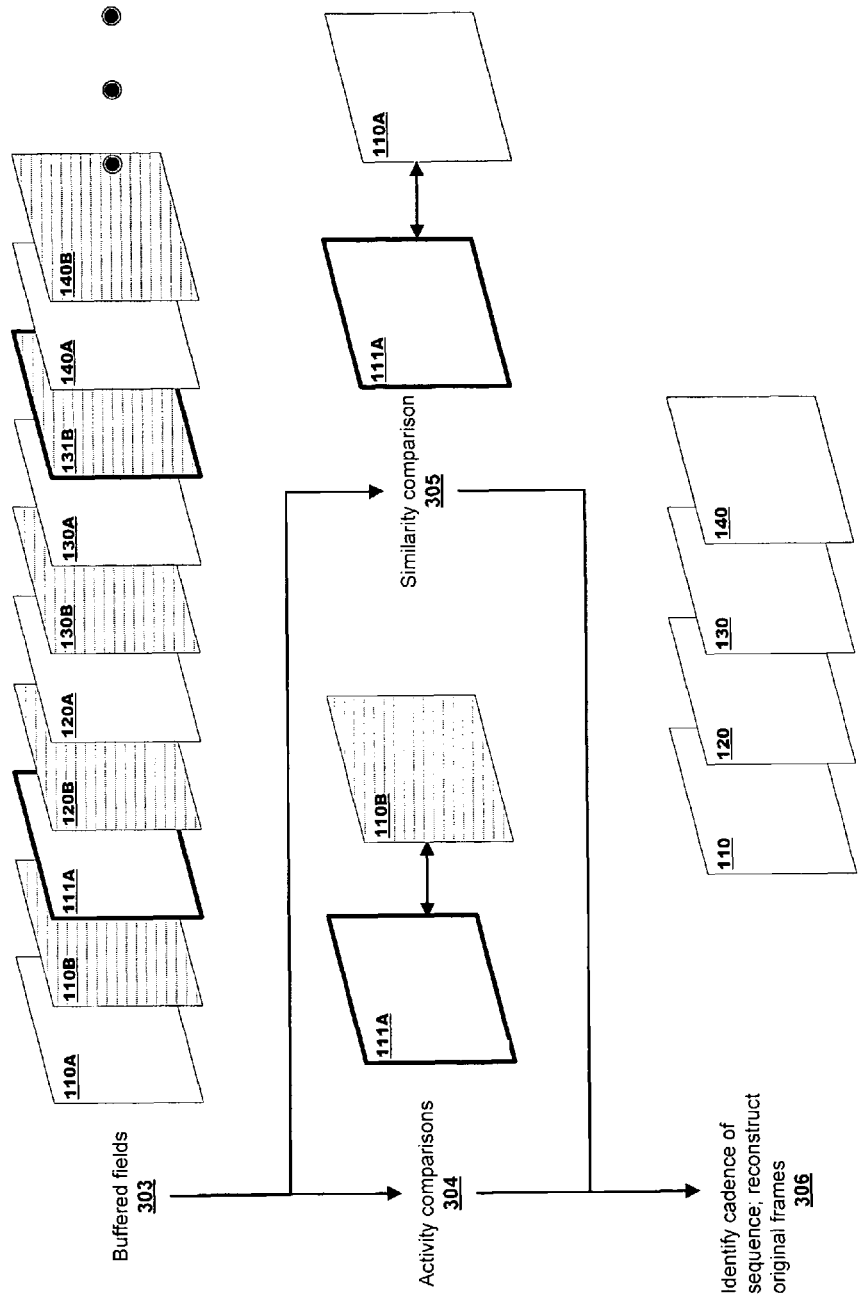
FIG. 3 shows an example of pulldown correction applied to a video sequence according to an embodiment of the invention.

Referring now to FIG. 3, when embodiments of the present invention are used to perform cadence detection and pulldown correction, a series of fields are buffered at 303. The fields are buffered in the natural display order 110A, 110B, 111A, 120B, 120A, 130B, . . . 140B as shown. To perform pulldown correction, two tests may be performed.

Field and frame activity comparisons 304 are made between each field and the previous field of opposite parity. For example, when field 111A is considered, activity comparisons are made between field 111A and the previous field of opposite parity, field 110B. A higher field activity indicates that the pairing of those two fields is likely progressive. If the frame activity is higher than the field activity, the pairing of those two fields is likely to represent interlaced data. Various thresholds, parameters, and biases may be applied as part of the comparison to determine whether the fields represent interlaced or progressive data.

A similarity comparison 305 may also be made to determine if a field is a repeat field. As an example, a field 111A, which is a copy of field 110A, is compared to the previous field of the same parity, field 110A. If the two fields are sufficiently similar, the later field may be marked as a repeat field. In the example shown in FIG. 3, the field 111A would be very similar, and the second copy would therefore be marked as a repeat field. Various methods of comparing a field to the previous field of the same parity may be used; specific techniques to do so and related examples are described below.

After fields have been identified as repeated fields and the data type (progressive or interlaced) have been determined, the original progressive frames 110, 120, 130, 140, etc. may be reconstructed at 306. In addition, the cadence of the video stream may be detected and monitored to detect scene changes, and other functions may be performed. Examples of these functions according to the present invention are described below.

Similarity Measure

As noted, the similarity measure may provide an indication of similarity of content between two consecutive fields of the same parity. FIG. 4 illustrates a similarity measurement according to an embodiment of the present invention. Each field may be divided into blocks of pixels 410, 420 of predetermined size, such as square blocks of 16×16 pixels. Other pixel sample sizes may be used. In FIG. 4, fields 401A and 402A are compared. Differences between corresponding pixels are calculated for each block. For example, for each block of pixels 410, 420 ($D_k$), the following values may be calculated using $$ME(k) = \sum_{i,j \in D_k} (pixA_{i,j} - pixB_{i,j})^2 \quad \text{(Eq. 1)}$$

$$MEScore = \text{Max}(ME(k)), \quad \text{(Eq. 2)}$$

where $pixA_{i,j}$, $pixB_{i,j}$ represent pixel values from fields A and B each at location i,j. In Eq. 1, the value ME(k) indicates how similar the blocks are. A higher ME(k) value indicates the blocks are less similar. If two blocks are identical, they will have an ME(k) of 0. The MEScore value in Eq. 2 represents highest ME(k) value calculated for any block in the two fields. The MEScore is consistently associated with one of the two fields being compared. The higher the MEScore for a pair of fields, the less likely that one field is a repeat of the other field.

Figure 5:
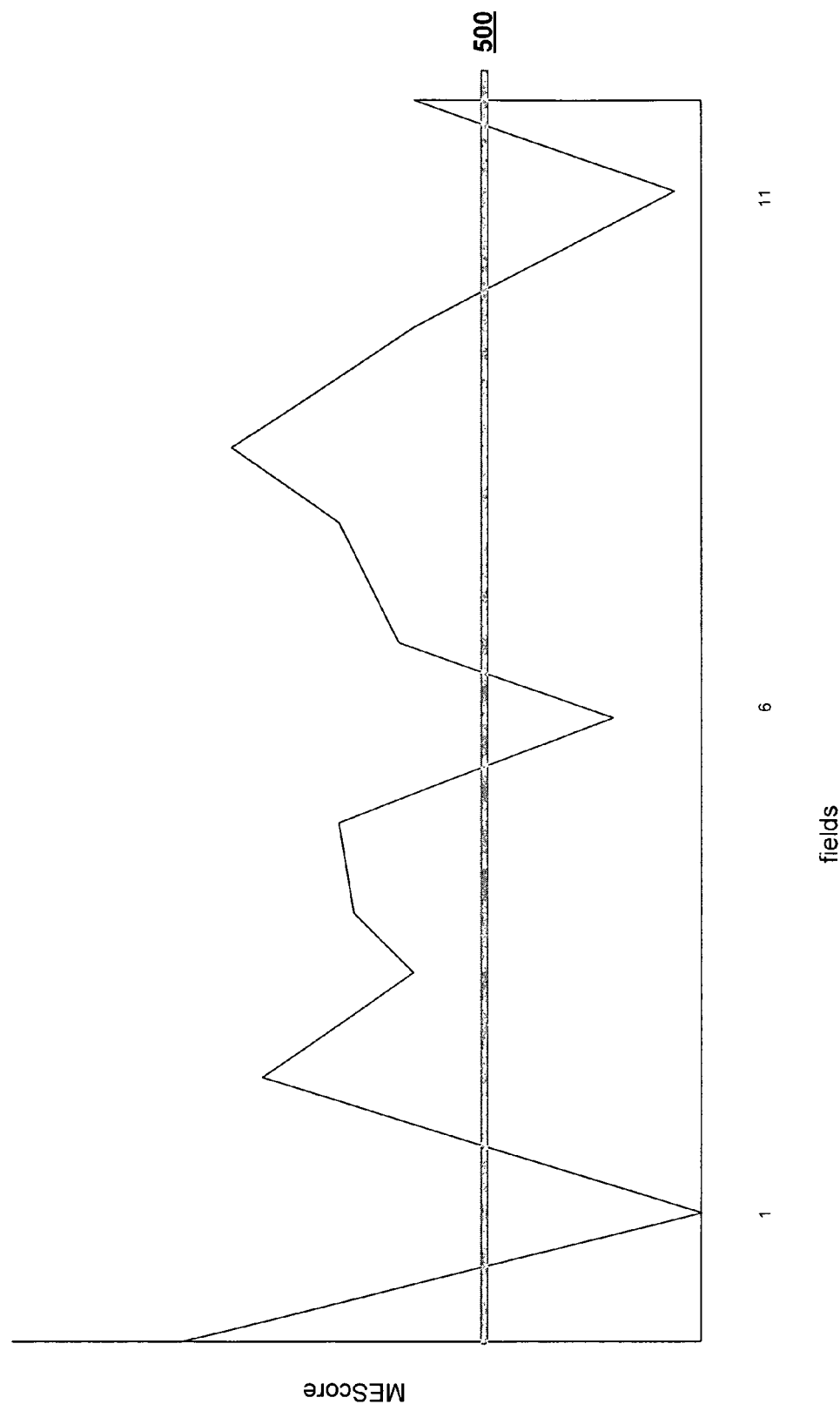
FIG. 5 is a plot of exemplary similarity comparison values according to an embodiment of the present invention.

In an embodiment, an adaptive threshold may be calculated for a series of buffered fields. MEScore values may vary considerably. As noted, even if one field is a repeat of another field, the MEScore for the pair may not be zero due to encoding artifacts, noise in the original video sequence, etc. FIG. 5 illustrates a graph of exemplary MEScores for twelve fields (numbered 1-12) and a threshold. The threshold 500 may be calculated, for example, by sorting the MEScore values of the fields in the buffer in increasing order, and deriving a maximum of the second-order derivative as the threshold. The adaptive threshold may be readjusted with each new field that enters and leaves the twelve-field buffer, or it may be adjusted at regular or varying intervals. Fields having an MEScore lower than the threshold may be marked as repeat fields. In the example shown in FIG. 5, fields 1, 6, and 11 are below the threshold, and therefore may be marked as repeat fields. In some embodiments, fields marked with a repeat-field flag inside a compressed video stream may be given an MEScore of zero. For example, field 1 in FIG. 5 may have been marked as a repeat field prior to entering the buffer, and therefore has an MEScore of zero.

Frame and Field Activity

Consecutive fields of opposite parity also may be compared to determine if the fields represent progressive or interlaced data. The "field activity" and "frame activity" are determined for each pair of fields. Field activity refers to activity within each individual field. Frame activity refers to activity in the same area of the image when the fields are paired together and considered as a complete frame.

For example, each field may be divided into blocks of 16×8 pixels, similar to the technique used to calculate the similarity measure. The following calculations may be used to determine the field activity and frame activity.

$$EvenAct = \sum_{j=0}^{j<4} \sum_{i=0}^{i<16} |pix_{i,2,j} - pix_{i,2,j+1}|, \text{ for each } 16 \times 8 \text{ block} \quad \text{(Eq. 3)}$$

$$OddAct = \sum_{j=0}^{j<4} \sum_{i=0}^{i<16} |pix_{i,2,j} - pix_{i,2,j+1}|, \text{ for each } 16 \times 8 \text{ block} \quad \text{(Eq. 4)}$$

$$FieldAct = EvenAct + OddAct \quad \text{(Eq. 5)}$$

EvenAct provides a measure of the field activity for the even field, such as field 111A in FIG. 3. Similarly, OddAct provides a measure of the field activity for the odd field considered at the same time, such as field 110B in FIG. 3. The total field activity, FieldAct, is the sum of the even and odd field activities.

A frame activity may be measured over blocks formed by interleaving even and odd blocks:

$$FrameAct = \sum_{j=0}^{j<8} \sum_{i<0}^{i<16} |pix_{i,2,j} - pix_{i,2,j+1}|, \text{ for each } 16 \times 16 \text{ block} \quad \text{(Eq. 6)}$$

Thereafter, for each block, the field activity is compared to the frame activity. If the field activity is less than the frame activity, then the block is considered to represent interlaced data, otherwise it is considered to be progressive. If enough blocks are progressive, the pair of fields will be considered progressive. A threshold may be used, such as requiring that a majority of the blocks display progressive data for the pair of fields to be considered progressive.

Additional measurements may be used. For example, a field count (fldCount) measure may be useful in detecting cadences, where the field count is equal to the total number of block pairs having a smaller FieldAct than the corresponding FrameAct. Thus, for each pair of fields divided into b blocks, the fldCount may be calculated as:

$$fldCount = \sum_b \begin{cases} 1 & \text{if } FrameAct > FieldAct \\ 0 & \text{if } FieldAct > FrameAct \end{cases} \quad \text{(Eq. 7)}$$

Other biases and ranges may be used to calculate the field count of a pair of fields.

Specific calculations and measurements other than the examples above may also be used to determine the field and frame activities and the field count.

Cadence Detection

Figure 1:
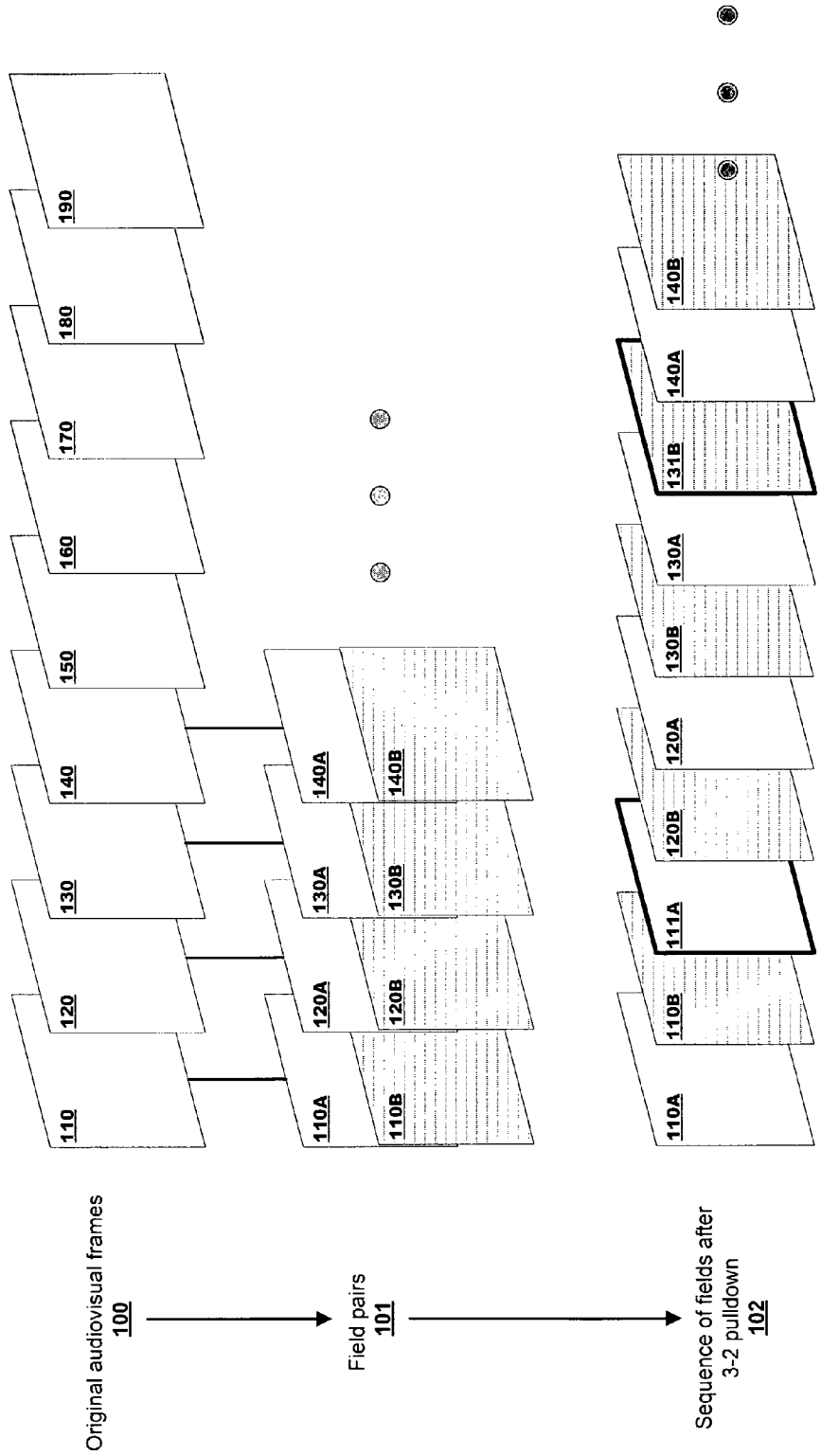
FIG. 1 shows a common pulldown technique applied to a video sequence.

In some embodiments, multiple fields may be buffered and a cadence detected by examining the pattern of repeated fields. For example, if the pattern of repeated fields matches that shown as 102 in FIG. 1, the stream will be identified as having a 3-2 cadence. The 3-2 cadence may be the most likely, and in some embodiments special care may be taken to identify and manipulate video streams having a 3-2 cadence. Other cadences are possible, and may be detected and utilized according to embodiments of the invention. Once the cadence has been identified, the video stream is monitored to identify any changes or breaks in the cadence. For example and as discussed below, a scene change may break the cadence of a video stream, resulting in unpaired fields.

The principles of the present invention may be extended to detect a cadence within the video stream and to group fields into frames even in the presence of discontinuities such as scene cuts. To do so, a number of fields may be buffered and various measurements analyzed over a series of fields. For example, the MEScore and fldCount measurements previously described may be used to detect a cadence. As a specific example, 12 fields may be buffered, allowing for the collection of sufficient data to detect a 3-2 pulldown cadence twice within the buffered fields.

If a field has been previously indicated as a repeat field, for example by having an associated repeat flag set in the compressed bit stream, the MEScore and/or fldCount of the field may be set to zero without performing the associated measurements and calculations. Both values may also be calculated for each field. Repeat fields, and hence the cadence of the video stream, may be determined based on patterns present in MEScore values, fldCount values, or both.

In an embodiment, a field may be considered a repeat field if it has a small MEScore. As previously described with respect to FIG. 5, an adaptive threshold may be used in conjunction with MEScore values to identify repeat fields. The MEScore values shown in FIG. 5 may represent, for example, the values that would be expected for a 3-2 cadence. Hence, a sample criteria that could be used to detect a cadence is a small (i.e., below the threshold) MEScore in field positions 1, 6, and 11 in the series of 12 buffered fields. A field may also be identified as a repeat field if it has both a small MEScore and a small fldCount.

Figure 6:
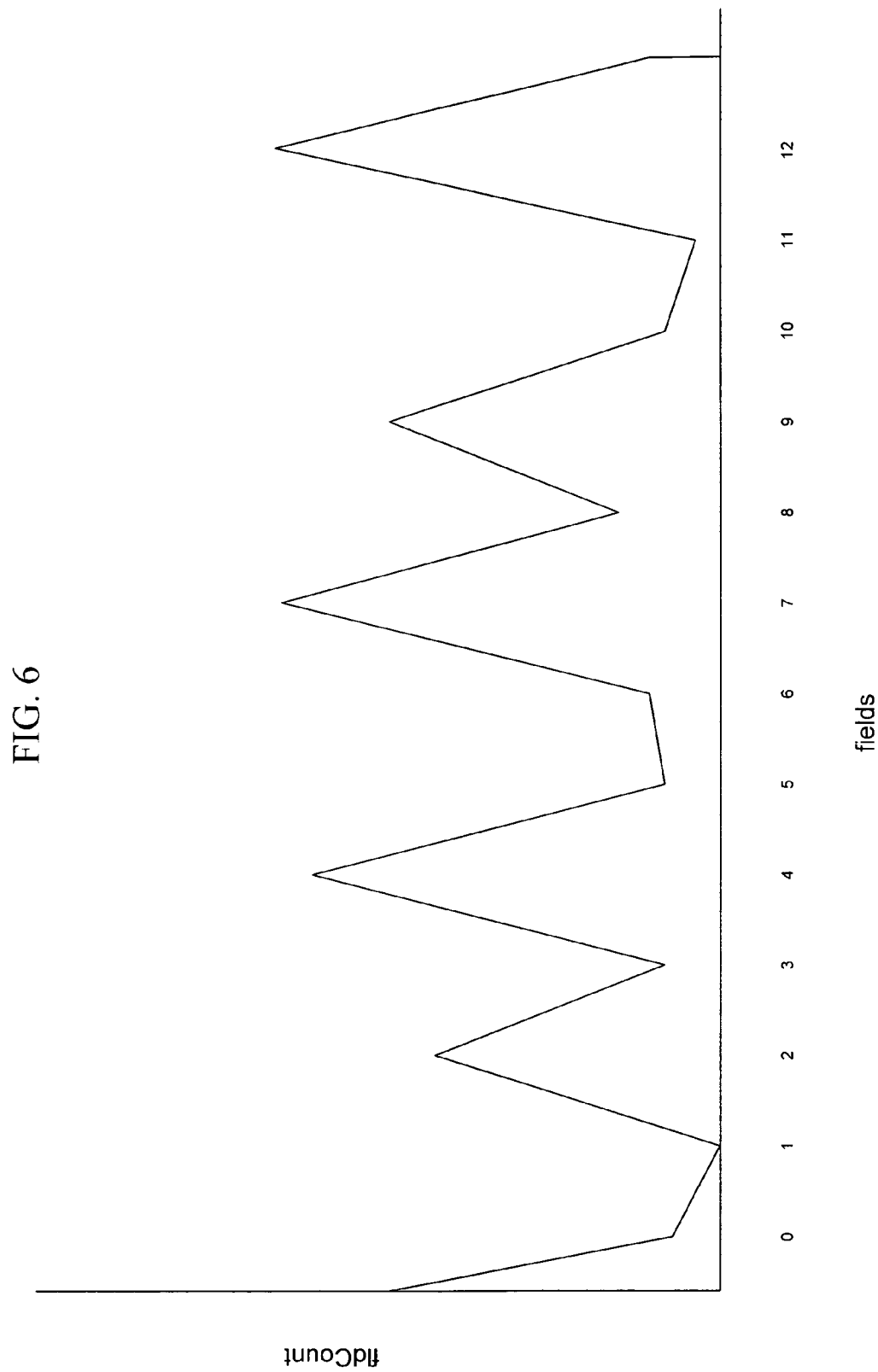
FIG. 6 is a plot of exemplary measurements of relative field and frame activity for a series of video fields according to an embodiment of the present invention.

In an embodiment, a cadence may be detected using a pattern in the fldCount values. For example, FIG. 6 shows a fldCount pattern for a video stream having a 3-2 cadence. As with MEScore values, some fldCount values may be set to zero based on the presence of a repeat field flag in the compressed bitstream. Once the fldCount values have been calculated for the 12 fields in the buffer, various criteria may be applied to determine the cadence. For example, the following criteria may represent fldCount values that represent a 3-2 cadence:

fldCount at fields 0 and 1 is less than 75% of fldCount at field 2 fldCount at field 3 is less than 75% of fldCount at fields 2 and 4 fldCount at fields 5 and 6 is less than 75% of fldCount at field 7 fldCount at field 8 is less than 75% of fldCount at fields 7 and 9 fldCount at fields 10 and 11 is less than 75% of fldCount at field 9

If the fields in the stream match the criteria defined for a given cadence, the stream will be treated as if it has that cadence. The video stream may be stored with an identifier of the cadence, or the cadence may be provided to another device in the processing sequence, such as an encoder, decoder, processing unit, or display unit. Various other criteria may be used. For example, if more certainty is required regarding the presence of a 3-2 cadence, the criteria above could be altered to require a greater difference between adjacent fields or field pairs. That is, the criteria would require the fldCount of the field or fields to be more than 75% less than the fldCount of adjacent fields.

Cadences may also be detected using multiple parameters or measurements. In an embodiment both the MEScore and fldCount measurements are used to detect a cadence. In such an embodiment, a 3-2 cadence may be identified by a buffer of 12 fields in which the fields at positions 1, 6, and 11 have both a small MEScore and a small fldCount. Other cadences may be detected based on known patterns of repeated fields.

Additional analysis may be performed on fields as they enter the buffer, for example to correctly pair fields into frames. In an embodiment, fields may be partitioned into categories based on their fldCount values, such as: very low (fldCount<1% of total blocks); high (fldCount>10% of total blocks); and very high (fldCount>95% of total blocks). If there are a large number of fields in the first category, the stream may contain progressive frames and the fields may be paired so as to retrieve the frames. In general, it may be desirable to pair a field with a very low fldCount value with its immediate predecessor to form a progressive frame. Other pairings may be used, based on the field counts and similarity measures of fields in the buffer. For example, prior to detection of a cadence or if no cadence can be detected in the video stream, fields may be paired into frames based on these or similar criteria. For example, a field with a very low fldCount value and a low MEScore followed by a field with a high fldCount may be a repeat field; in some applications, such a field may be dropped. In some embodiments, if two consecutive fields with high fldCount values are followed by a field with a low fldCount value, the first field may be dropped and the second and third paired in a frame. If no abnormal pairings are detected, the fields may be paired as they arrive.

Scene Change Detection

Scene change detection may be performed to determine if a cadence break resulted from a scene change. Fields before and after a scene change may be paired into frames according to the cadence or cadences that were detected prior to and/or after the scene change. Singleton fields, i.e., those that do not pair with a field of opposite polarity, may also be accounted for. For example, these fields may be dropped from the video stream (i.e., not encoded, displayed, etc.), or they may be interpolated to create a complementary field of opposite polarity or to create a complete frame. The presentation time stamp (PTS) of fields remaining in the video stream may then be adjusted to account for any dropped fields, cadence changes, etc. that may require an alteration of the presentation times of each field. Specific examples of scene change detection and PTS adjustment are given below.

Once a cadence has been detected, the cadence may be extrapolated beyond the fields in the buffer. As additional fields enter the buffer, each field is measured for the criteria used to detect the cadence. If the cadence present in the fields entering the buffer does not match the extrapolated cadence (i.e., there is a broken cadence), a scene change or other break in the stream may be present. It may be desirable to detect scene changes, since the editing process often results in fields where the corresponding field of opposite parity was removed. If the unpaired field is displayed normally, unpleasant visual artifacts may result.

Figure 7:
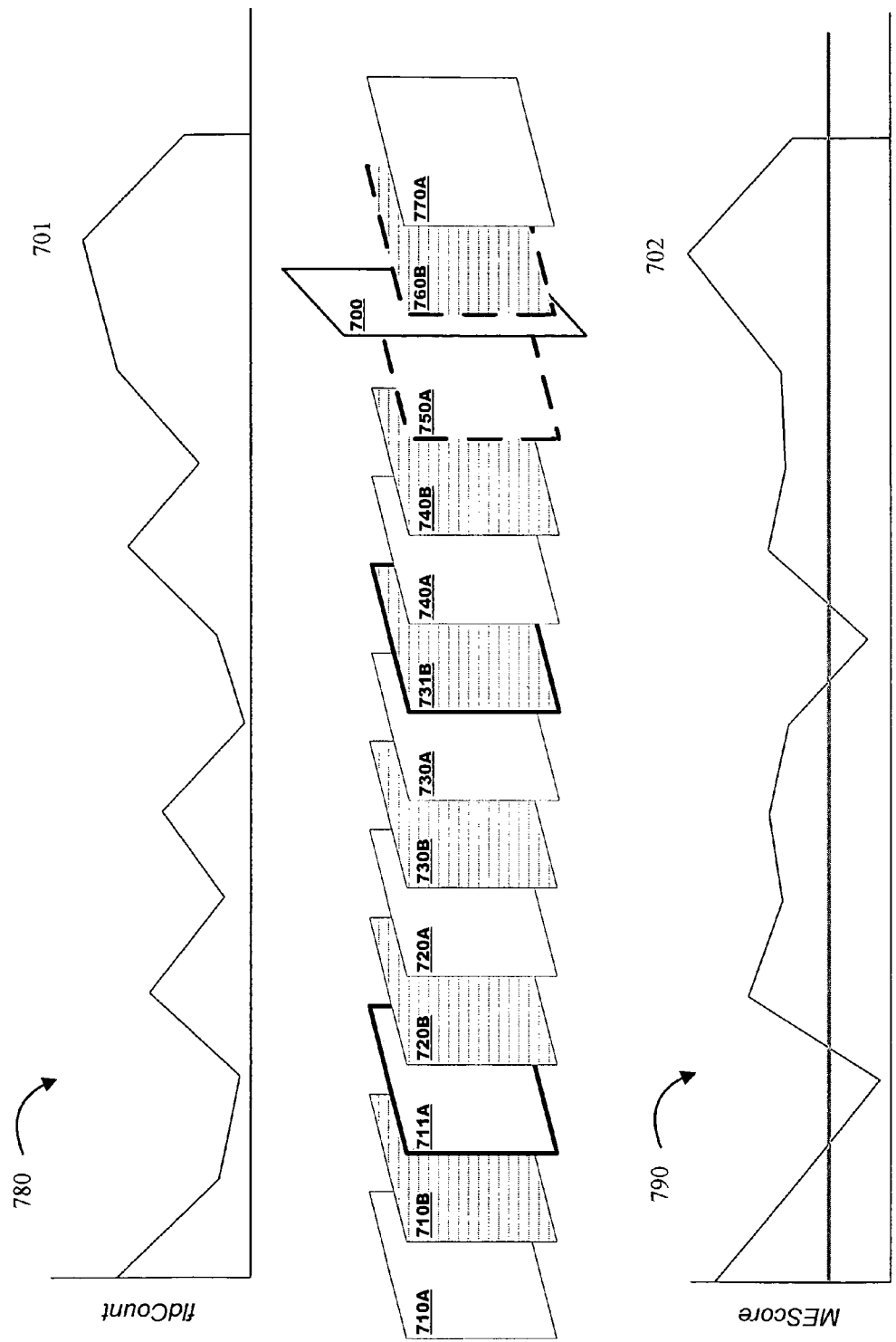
FIG. 7 shows the identification of a scene change according to an embodiment of the present invention.

FIG. 7 shows an example of a video stream that includes a scene change. Fields 710A, 710B, 720A, 720B, . . . 750A correspond to original video frames as previously described. Repeat fields 711A, 731B are shown in bold outlines.

As an example, the video stream represented by the fields 710A . . . 740B has a 2-3 cadence. In the region of the scene change 700, the values of MEScore 790 and fldCount 780 for fields 750A and 760B do not match those expected for the 2-3 cadence of the video stream. For example, in a complete 3-2 cadence, field 770A would be a repeat field and thus have a MEScore below the adaptive threshold. Additionally, these two "singleton" fields 750A, 760B do not have corresponding opposite-parity fields. To avoid unpleasant visual artifacts, these fields may be dropped or otherwise accounted for.

In an embodiment of the present invention, singleton fields such as fields 750A and 760B may be detected by the presence of an unusually high similarity measure and an unusually high field count. FIG. 7 shows example plots of field count (fldCount) 780 and similarity measure (MEScore) 790 for the video stream represented by fields 710A . . . 770B. In the example, field 760B is the first field after the scene change 700. The MEScore value 702 and fldCount value 701 associated with that field are both higher than would be expected based on the values associated with surrounding fields, indicating that a scene change has occurred. When such a scene change is detected, the cadence immediately prior to the scene change may be extrapolated by associating fields in pairs until the scene change is reached. A singleton field immediately prior to the scene change may be detected based on the lack of a corresponding field of opposite parity prior to the scene change. For example, in FIG. 7 the fields prior to the scene change could be paired as (710A, 710B); (720B, 720A); (730B, 730A); and (740A, 740B) (repeat fields are dropped). There is no similar pairing available for field 750A, indicating that it is a singleton field. The singleton field may be dropped or interpolated to create a new frame. For example, the singleton field may be made into a frame via line doubling, linear interpolation, or other methods and techniques known in the art.

Similarly, if a cadence is detected after the scene change, the fields between the scene change and the beginning of the cadence may be examined to determine if there is an additional singleton field immediately after the scene change. If so, the field may be dropped or interpolated into a frame.

Presentation Time Stamp Adjustment

As a video stream is processed according to embodiments of the invention, fields may be paired into progressive frames. Some fields, such as singleton fields in the region of a scene change, normal repeated fields, etc. may be dropped and will not be displayed. To avoid jitter in the playback of the video stream, the presentation time stamp (PTS) of each field may be adjusted to compensate for fields that were dropped. A presentation time stamp indicates the time at which a field should be displayed relative to the rest of the video sequence.

In an embodiment, as each field enters the buffer it may be associated with a presentation time stamp based on the display rate of the sequence and the presence of repeat field flags in the stream. At various intervals, the PTS for each field may be recalculated. For example, the PTS may be recalculated for each group of ten fields entering the buffer. As an example, the time difference between the first and last fields in the buffer may be divided among the fields in the buffer that are to be displayed. As a specific example, in a series of ten fields, eight of which are to be displayed, the difference D between the PTS of adjacent displayed fields may be calculated as:

$$D = \frac{1}{8}[10 \times (PTS_{10} - PTS_1)] \quad \text{(Eq. 8)}$$

where $PTS_n$ represents the presentation time stamp of the nth field in the series.

Reassembly of Frames

Figure 8:
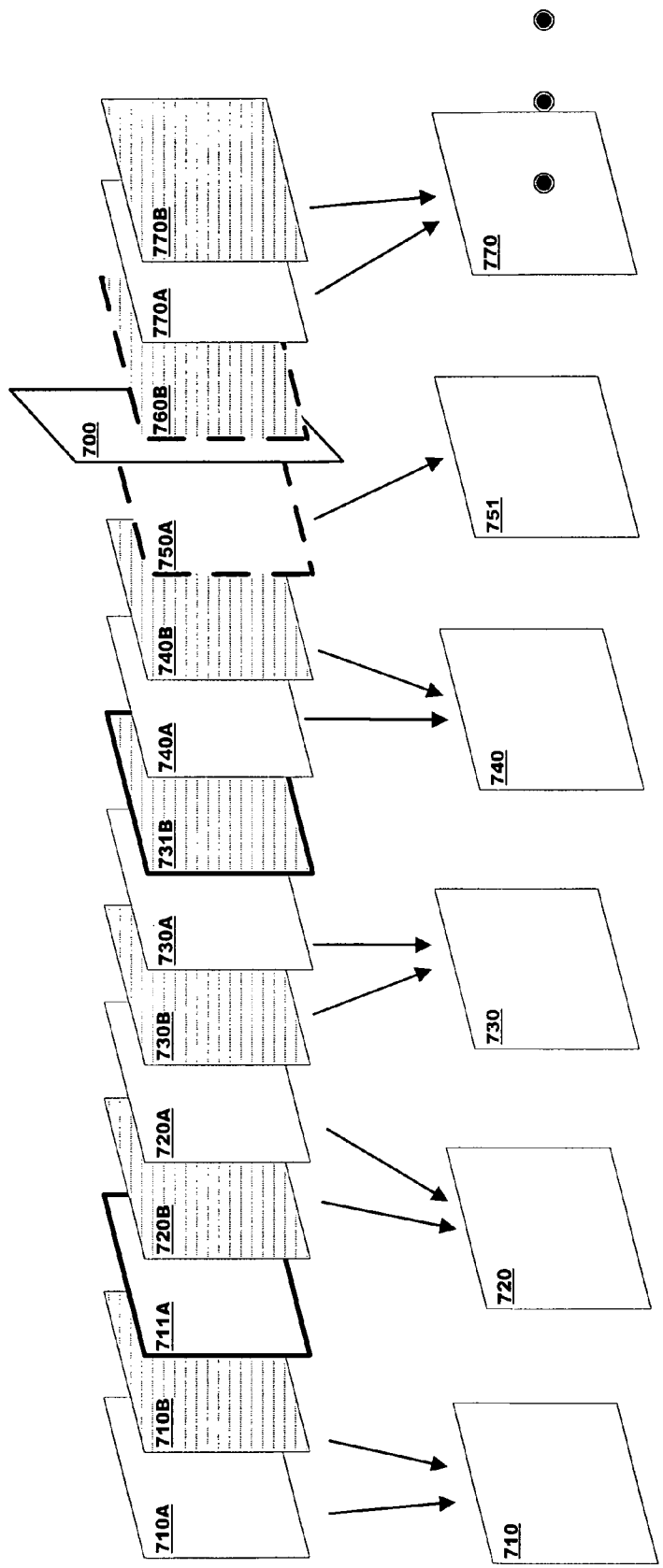
FIG. 8 shows the reconstruction of a video stream having a scene change according to an embodiment of the present invention.

In an embodiment, the original progressive frames of a video sequence may be reassembled. FIG. 8 shows a series of video fields reconstructed into video frames according to embodiments of the present invention. Fields 710A through 770B are video fields in a video sequence as previously described. Repeat fields 711A, 731B are present as the result of a pulldown or other conversion performed on the original video source. A scene change 700 occurs after field 750A, resulting in two singleton fields 750A, 760B.

When the fields are examined, repeat fields 711A and 731B may be identified using the methods previously described; the repeat fields may also be associated with a repeat-field flag in the bitstream. When reconstructing the original frames, the repeat fields may be dropped, i.e., not included in the final series of frames, as shown. The similarity measure, field count, and other information about each field may be used to reassemble the fields into their original frames 710, 720, 730, 740, and 770 as shown. At the scene change 700, each singleton field may be interpolated into a complete frame or dropped from the video stream. In the example, a singleton field 750A prior to the scene change is interpolated to create a new frame 751. A singleton field 760B after the scene change is dropped.

Figure 9:
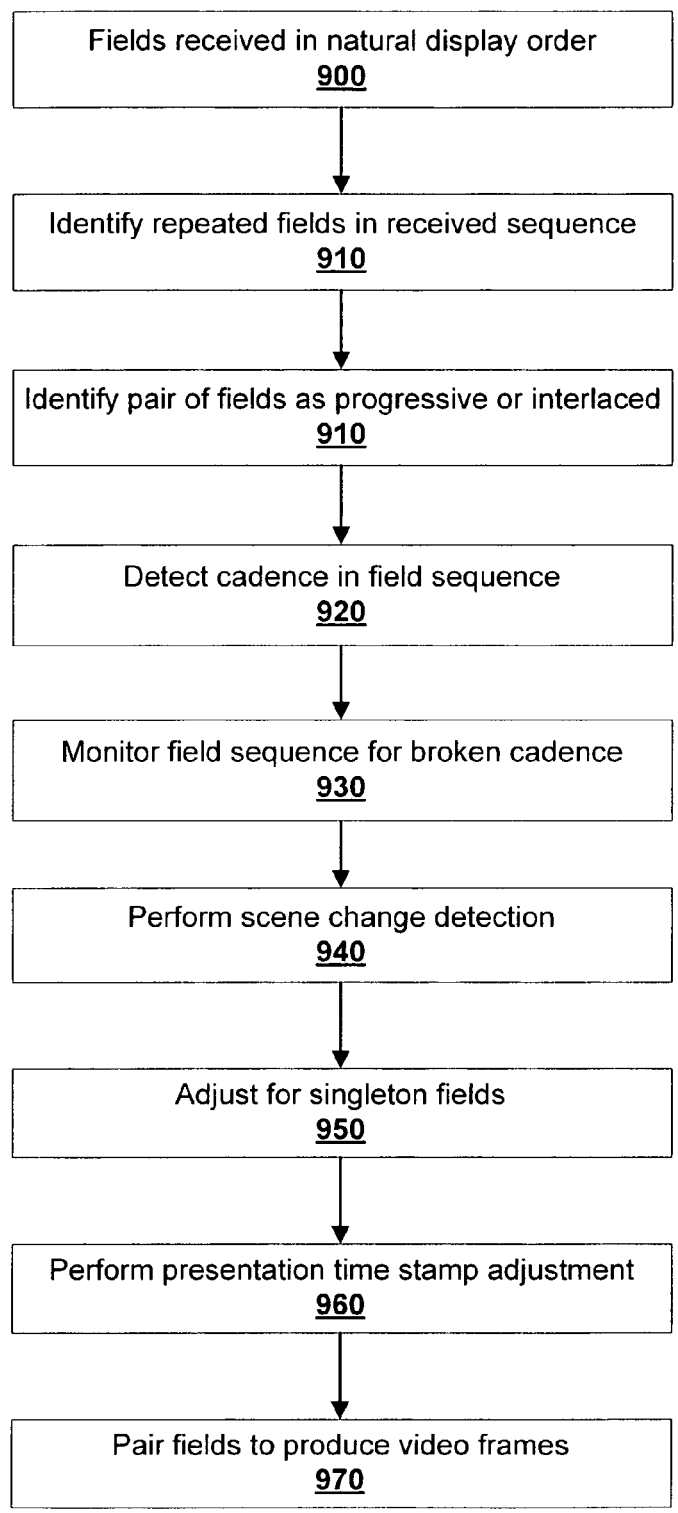
FIG. 9 is a flowchart showing a method of reassembling video frames according to an embodiment of the present invention.

FIG. 9 shows a process for reassembling a sequence of video fields into video frames for display as interlaced or progressive data according to the invention. In an embodiment, fields are received in the natural display order 900. A pair of fields may be identified as progressive or interlaced 910 based on various measurements as previously described. A cadence may be detected in the field sequence 920. Once a cadence is detected, the field sequence may be monitored for breaks in the cadence 930 that may represent scene changes. If scene changes are detected 940, corrections may be made to the field sequence such as adjusting for singleton frames 950. After duplicate and singleton fields have been dropped, interpolated, or otherwise accounted for, the presentation time stamp of each field may be adjusted 960. Finally, fields may be paired 970 to produce frames in a desired format.

Video Type Detection

In some embodiments, the present invention may be used to determine the video type, such as interlaced or progressive, of an original video stream. After the similarity measure and/or field count has been calculated for a set of fields, a pattern may be detected in the similarity measure and/or field count as previously described. This pattern may then be compared to patterns that would be expected for various video types.

In an embodiment, methods according to the invention may be used to distinguish between a sequence of video fields representing an original video sequence of progressive data, and a sequence of video fields representing an original video sequence of interlaced data. For example, a post-processor may be used that can distinguish between a field corresponding to a 24 fps progressive video, and a 30 fps interlaced video. If a sequence of fields has the pattern of repeat fields associated with the 3-2 pulldown as shown in FIG. 3, such a post-processor may treat the original video stream as being progressive. Similarly, if no pattern of repeat fields is detected, the post-processor may treat the original video stream as an interlaced stream.

Although the present invention has been described with reference to particular examples and embodiments, it is understood that the present invention is not limited to those examples and embodiments. The present invention as claimed therefore includes variations from the specific examples and embodiments described herein, as will be apparent to one of skill in the art. For example, although many of the examples herein are given with respect to the 3-2 pulldown technique and the resulting cadence, embodiments of the present invention may similarly be used with various other conversion techniques and cadences.

What is claimed is:

1. A cadence detection method for a sequence of video data received at a video coder, the video data populated by fields of video content, comprising, for a plurality of candidate fields from the sequence:

generating, with the coder, a similarity measure from a comparison of image content of the candidate field to corresponding content of a same-parity field immediately prior to the candidate field in display order,
determining, with the coder, a level of activity in the candidate field,
determining, with the coder, a level of activity of an opposite-parity field immediately prior to the candidate field in display order,
determining, with the coder, a level of activity of a frame formed from the candidate field and the opposite-parity field,
comparing, with the coder, the activity of the frame to an aggregate of the activity of the candidate field and the activity of the opposite-parity field, and
assigning, with the coder, a cadence to the video sequence based on the similarity measures and the activity comparisons among the plurality of fields;
wherein assigning a cadence to the video sequence includes identifying a pattern in fields with a low activity comparison;
wherein a field has a low activity comparison if the activity comparison is below a predetermined percentage of the activity comparison of a second field.

2. The method of claim 1 further comprising comparing the similarity measures to a threshold.

3. The method of claim 2, wherein the threshold is predetermined.

4. The method of claim 2, wherein the threshold is adaptive based on similarity measures from a continuous sequence of fields surrounding the candidate field.

5. The method of claim 2, further comprising identifying each field having a similarity measure that meets the threshold as a repeat field.

6. The method of claim 5, further comprising adjusting the presentation time stamp of each candidate field, wherein the adjustment is based on the proportion of fields identified as repeat fields in the plurality of fields to the total number of candidate fields.

7. The method of claim 5, further comprising identifying the type of a video sequence represented by the sequence of video data, based on a pattern in the fields identified as repeat fields.

8. The method of claim 7, further comprising controlling a display device based on the type of the video sequence.

9. The method of claim 1, wherein the similarity measure is generated for each of a plurality of pixel blocks within the candidate field and the same-parity field.

10. The method of claim 1, wherein the plurality of candidate fields are continuous in display order.

11. The method of claim 1, wherein the plurality of candidate fields are from distributed display order positions in the video sequence.

12. The method of claim 1, further comprising controlling a display device based on the cadence assignment.

13. The method of claim 1, further comprising controlling a video coder based on the cadence assignment.

14. The method of claim 1, further comprising controlling a pulldown correction process based on the cadence assignment.

15. A method for determining the type of an original video stream received at a video coder, the original video stream represented by a sequence of fields of video content, comprising, for a plurality of candidate fields from the sequence:
generating, with the coder, a similarity measure from a comparison of image content of the candidate field to corresponding content of a same-parity field immediately prior to the candidate field in display order,
determining, with the coder, a level of activity in the candidate field,
determining, with the coder, a level of activity of an opposite-parity field immediately prior to the candidate field in display order,
determining, with the coder, a level of activity of a frame formed from the candidate field and the opposite-parity field,
comparing, with the coder, the activity of the frame to an aggregate of the activity of the candidate field and the activity of the opposite-parity field, and
assigning, with the coder, a cadence to the video sequence based on a pattern of the similarity measures and the activity comparisons among the plurality of fields;
wherein the pattern of similarity measures is identified in fields with a low activity comparison;
wherein a field has a low activity comparison if the activity comparison is below a predetermined percentage of the activity comparison of a second field.

16. The method of claim 15 further comprising comparing the similarity measures to a threshold.

17. The method of claim 16, wherein the threshold is predetermined.

18. The method of claim 16, wherein the threshold is adaptive based on similarity measures from a continuous sequence of fields surrounding the candidate field.

19. The method of claim 16, further comprising identifying each field having a similarity measure that meets the threshold as a repeat field.

20. The method of claim 19, further comprising adjusting the presentation time stamp of each candidate field, wherein the adjustment is based on the proportion of fields identified as repeat fields in the plurality of fields to the total number of candidate fields.

21. The method of claim 15, wherein the similarity measure is generated for each of a plurality of pixel blocks within the candidate field and the like-parity field.

22. The method of claim 15, further comprising detecting a scene change in the sequence of video data based on a change in the pattern of the similarity measures and the activity comparisons among the plurality of fields.

23. The method of claim 22, further comprising pairing each candidate field to a field of opposite parity if the similarity measures and the activity comparisons of the candidate field and the field of opposite parity indicate that the fields are part of a frame.

24. The method of claim 22, further comprising identifying a field that does not have a matching field of opposite parity and dropping the unmatched field from the sequence.

25. The method of claim 22, further comprising identifying a field that does not have a matching field of opposite parity and interpolating the unmatched field to form a frame.

26. A system for detecting the cadence of a video stream, comprising:
a buffer to receive sequential fields of the video stream; and
a video coder to:
generate a similarity measure from a comparison of image content of a candidate field to corresponding content of a same parity field immediately prior to the candidate field,
determine a level of activity in the candidate field;
determine a level of activity of an opposite-parity field immediately prior to the candidate field in display order,
determine a level of activity of a frame formed from the candidate field and the opposite-parity field,
generate an activity comparison for the activity of the frame to an aggregate of the activity of the candidate field and the activity of the opposite-parity field, and
identify repeat fields in the video stream and generate a cadence to the video stream based on a pattern in the similarity measures and the activity comparisons among the plurality of fields;

wherein the pattern is identified for fields with a low activity comparison;

wherein a field has a low activity comparison if the activity comparison is below a predetermined percentage of the activity comparison of a second field.

27. The system of claim 26 further comprising a control unit to control a display device based on the cadence assigned to the video stream.

28. The system of claim 26 wherein the processor adjusts the presentation time stamp of each field based on the proportion of fields identified as repeat fields in the plurality of fields to the total number of candidate fields.

29. A system for detecting the type of a video stream, comprising:

a buffer to receive sequential fields of the video stream; and a video coder to:

generate a similarity measure from a comparison of image content of a candidate field to corresponding content of a same-parity field immediately prior to the candidate field, determine a level of activity in the candidate field;

determine a level of activity of an opposite-parity field immediately prior to the candidate field in display order, determine a level of activity of a frame formed from the candidate field and the opposite-parity field, generate an activity comparison of the activity of the frame to an aggregate of the activity of the candidate field and the activity of the opposite-parity field, and identify repeat fields in the video stream and determine the format of the original video stream based on a pattern of repeat fields;

wherein repeat fields are identified by identifying a pattern in fields with a low activity comparison;

wherein a field has a low activity comparison if the activity comparison is below a predetermined percentage of the activity comparison of a second field.

30. The system of claim 29 wherein the video stream comprises progressive data.

* * * * *